(12) United States Patent
Suresh et al.

(10) Patent No.: US 10,167,392 B2
(45) Date of Patent: Jan. 1, 2019

(54) COMPOSITIONS OF COATED DIAMOND NANOPARTICLES, METHODS OF FORMING COATED DIAMOND NANOPARTICLES, AND METHODS OF FORMING COATINGS

(71) Applicant: Baker Hughes Incorporated, Houston, TX (US)

(72) Inventors: Radhika Suresh, Sugar Land, TX (US); Joshua C. Falkner, Richmond, TX (US); Valery N. Khabashesku, Houston, TX (US); Othon R. Monteiro, Houston, TX (US); Devesh K. Agrawal, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 376 days.

(21) Appl. No.: 14/530,205

(22) Filed: Oct. 31, 2014

(65) Prior Publication Data

US 2016/0122551 A1  May 5, 2016

(51) Int. Cl.
    *C09D 1/00* (2006.01)
    *B05D 3/04* (2006.01)
    *C25D 13/02* (2006.01)

(52) U.S. Cl.
    CPC .............. *C09D 1/00* (2013.01); *B05D 3/044* (2013.01); *C25D 13/02* (2013.01)

(58) Field of Classification Search
    None
    See application file for complete search history.

(56) References Cited

U.S. PATENT DOCUMENTS

| | | |
|---|---|---|
| 3,617,347 A | 11/1971 | Kuratomi |
| 3,762,882 A | 10/1973 | Grutza |
| 3,980,549 A | 9/1976 | Grutza |
| RE33,767 E | 12/1991 | Christini et al. |
| 5,164,220 A | 11/1992 | Caballero |
| 5,277,940 A | 1/1994 | Caballero |

(Continued)

FOREIGN PATENT DOCUMENTS

| | | |
|---|---|---|
| CN | 1380363 A | 11/2002 |
| CN | 101029359 A | 9/2007 |

(Continued)

OTHER PUBLICATIONS

Translation of WO2007148667; Sep. 2017.*

(Continued)

*Primary Examiner* — Guinever S Gregorio
(74) *Attorney, Agent, or Firm* — TraskBritt (57) ABSTRACT

In a composition including a plurality of coated diamond nanoparticles, each diamond nanoparticle may have at least one silane functional group covalently bonded to a surface thereof. A method of forming coated diamond nanoparticles may include functionalizing surfaces of diamond nanoparticles with at least one of a fluorine-containing compound and an oxidant; dispersing the functionalized diamond nanoparticles in a solvent comprising a silane functional group; and forming covalent bonds between the silane functional group and the diamond nanoparticles. A method of forming a diamond coating may include depositing the diamond nanoparticles over a substrate.

18 Claims, 4 Drawing Sheets

(56) References Cited

U.S. PATENT DOCUMENTS

| | | | |
|---|---|---|---|
| 5,496,463 | A | 3/1996 | Mori et al. |
| 5,712,000 | A | 1/1998 | Wei et al. |
| 5,967,400 | A | 10/1999 | Bell et al. |
| 6,156,390 | A | 12/2000 | Henry et al. |
| 6,258,237 | B1 | 7/2001 | Gal-Or et al. |
| 6,286,498 | B1 | 9/2001 | Sung |
| 6,638,570 | B2 | 10/2003 | Veerasamy |
| 6,752,709 | B1 | 6/2004 | Skibo et al. |
| 7,201,972 | B2 | 4/2007 | Shiozaki et al. |
| 7,820,130 | B2 | 10/2010 | Khabashesku et al. |
| 7,858,186 | B2 * | 12/2010 | Khabashesku ......... B05D 1/185 428/408 |
| 2003/0220204 | A1 | 11/2003 | Baran, Jr. et al. |
| 2003/0228249 | A1 | 12/2003 | Fujimura et al. |
| 2005/0158549 | A1 * | 7/2005 | Khabashesku ........ C01B 31/065 428/403 |
| 2005/0287952 | A1 | 12/2005 | Ryan et al. |
| 2006/0169450 | A1 | 8/2006 | Mang |
| 2006/0269467 | A1 * | 11/2006 | Khabashesku ......... B05D 1/185 423/446 |
| 2007/0126312 | A1 | 6/2007 | Sung |
| 2007/0158619 | A1 | 7/2007 | Wang et al. |
| 2007/0199826 | A1 | 8/2007 | Son et al. |
| 2007/0298669 | A1 | 12/2007 | Barrera et al. |
| 2009/0155479 | A1 | 6/2009 | Xiao et al. |
| 2009/0211758 | A1 | 8/2009 | Bragg |
| 2009/0242414 | A1 | 10/2009 | Welz-Biermann et al. |
| 2010/0019456 | A1 | 1/2010 | Gerrard |
| 2010/0028675 | A1 | 2/2010 | Gogotsi et al. |
| 2010/0096139 | A1 | 4/2010 | Holcomb et al. |
| 2010/0243248 | A1 | 9/2010 | Golomb et al. |
| 2011/0024299 | A1 | 2/2011 | Reusmann |
| 2011/0108269 | A1 | 5/2011 | Van Den Berg et al. |
| 2011/0278002 | A1 | 11/2011 | McGuire |
| 2012/0148762 | A1 | 6/2012 | Wei et al. |
| 2012/0175534 | A1 | 7/2012 | Jung et al. |
| 2012/0181029 | A1 | 7/2012 | Saini et al. |
| 2012/0285690 | A1 | 11/2012 | Weaver et al. |
| 2013/0045897 | A1 | 2/2013 | Chakraborty et al. |
| 2013/0081335 | A1 | 4/2013 | Mazyar |
| 2013/0165353 | A1 | 6/2013 | Mazyar et al. |
| 2013/0341022 | A1 | 12/2013 | Nguyen et al. |
| 2014/0096964 | A1 | 4/2014 | Chakraborty et al. |
| 2014/0187449 | A1 | 7/2014 | Khabashesku et al. |
| 2014/0290958 | A1 | 10/2014 | Marr et al. |
| 2015/0047847 | A1 | 2/2015 | Mazyar et al. |
| 2015/0175807 | A1 * | 6/2015 | Jing ...................... C09D 5/002 428/412 |
| 2015/0225655 | A1 | 8/2015 | Adams et al. |
| 2015/0368539 | A1 | 12/2015 | Tour et al. |

FOREIGN PATENT DOCUMENTS

| | | | |
|---|---|---|---|
| CN | 102304737 | A | 1/2012 |
| CN | 102354609 | A | 2/2012 |
| CN | 102560415 | A | 7/2012 |
| CN | 102719693 | A | 10/2012 |
| CN | 102329976 | B | 1/2013 |
| EP | 1826294 | A1 | 8/2007 |
| JP | 62072511 | A | 4/1987 |
| JP | 04157157 | A | 5/1992 |
| JP | 2798523 | B2 | 9/1998 |
| JP | 2006225730 | A | 8/2006 |
| JP | WO 2007148667 | A1 * | 12/2007 ............ C01B 31/06 |
| JP | 5010945 | B2 | 8/2012 |
| JP | 2012200989 | A | 10/2012 |
| KR | 1020080093625 | A | 10/2008 |
| KR | 10-2009-0001161 | A | 1/2009 |
| KR | 10-2009-0010406 | A | 1/2009 |
| KR | 1020120027350 | A | 3/2012 |
| KR | 1020130002085 | A | 1/2013 |
| WO | 0075394 | A1 | 12/2000 |

OTHER PUBLICATIONS

Krueger; New Carbon Materials: Biological Applications of Functionalized Nanodiamond Materials; Chem. Eur. J.; 14, 1382-1390; 2008.*
Neuman et al.; Silica Encapsulation of Fluorescent Nanodiamond for Colloidal Stability and Facile Surface Functionalization; J. Am. Chem. Soc.; 135, 7815-7818; 2013.*
Helmenstine, T., Periodic Table of the Elements, Chemistry.About. Com, 2014, 1 page.
Agrawal et al., U.S. Appl. No. 14/744,520, filed Jun. 19, 2015, and titled Methods and Suspensions for Recovery of Hydrocarbon Material From Subterranean Formations.
Alvarado et al., Enhanced Oil Recovery: An Update Review, Energies, vol. 3, (2010), pp. 1529-1575.
Bryant et al., Development of Nanoparticle-Stabilized Foams to Improve Performance of Water-less Hydraulic Fracturing, Quarterly Progress Report, Oct. 1, 2013-Dec. 13, 2013, 16 pages.
Chakraborty et al., U.S. Appl. No. 14/519,496, filed Oct. 21, 2014, and titled Suspensions for Enhanced Hydrocarbon Recovery, and Methods of Recovering Hydrocarbons Using the Suspensions.
Drexler et al., Amphiphilic Nanohybrid Catalysts for Reactions at the Water/Oil Interface in Subsurface Reservoirs, Energy & Fuels, vol. 26, (2012), pp. 2231-2241.
Kuznetsov et al., U.S. Appl. No. 14/289,838, titled Methods of Obtaining a Hydrocarbon Material From a Mined Material, and Related Stabilized Emulsions, filed May 29, 2014.
Kuznetsov et al., U.S. Appl. No. 14/296,857, titled Flocculants and methods for Recovering Bitumen From Oil Sands, filed Jun. 5, 2014.
Luu et al., Nanoparticles Adsorbed at the Water/Oil Interface: Coverage and Composition Effects on Structure and Diffusion, American Chemical Society, Langmuir, vol., 29, (2013), pp. 7221-7228.
McElfresh et al., Application of Nanofluid Technology to Improve Recovery in Oil and Gas Wells, Society of Petroleum Engineers, (2012), SPE 154827, 6 pages.
Shen et al., Emulsions Stabilized by Carbon Nanotube-Silicon Nanohybrids, Languir, vol. 25, No. 18, (2009), pp. 10843-10851.
Suresh et al., U.S. Appl. No. 14/169,432, titled Nano-Surfactants for Enhanced Hydrocarbon Recovery, and Methods of Forming and Using such Nano-Surfactants, filed Jan. 31, 2014.
Suresh et al., U.S. Appl. No. 14/289,873, titled Suspensions Including Organic Bases for Enhanced Oil Recovery and Methods of Obtaining Hydrocarbons Using Such Suspensions, filed May 29, 2014.
Wasan et al., Spreading of Nanofluids on Solids, Nature, vol. 423, May 8, 2003, pp. 156-159.
Xue et al., Functionalization of Graphene Oxide with Polyhedral Oligomeric Silsesquioxane (POSS) for Multifunctional Applications, Journal of Physical Chemistry Letters, vol. 3 (2012), pp. 1607-1612.
The Free Dictionary, "Steel", 2015, p. 1-6.
Monteiro et al., U.S. Appl. No. 14/490,214 entitled, Methods of Coating Substrates with Composite Coatings of Diamond Nanoparticles and Metal, filed Sep. 18, 2014.
International Search Report for International Application No. PCT/US2015/057582 dated Feb. 11, 2016, 4 pages.
Written Opinion of the International Searching Authority for International Application No. PCT/US2015/057582 dated Feb. 11, 2016, 8 pages.
Krueger, Anke, "The structure and reactivity of nanoscale diamond," Journal of Materials Chemistry, 2008, vol. 18, pp. 1485-1492.
Lou et al., Electroplating, Encyclopedia of Chemical Processing, Taylor & Francis, (2006), pp. 1-10.
Jee et al., Surface Functionalization and Physicochemical Characterization of Diamond Nanoparticles, Current Applied Physics, vol. 9, No. 2, Mar. 2009, pp. e144-e147.
Tsubota et al., Composite Electroplating of Ni and Surface-Modified Diamond Particles with Silane Coupling Regent, Diamond & Related Materials, vol. 14, No. 3/7, Mar.-Jul. 2005, pp. 608-612.

(56) References Cited

OTHER PUBLICATIONS

Chang et al., Electrodeposition of Aluminum on Magnesium Alloy in Aluminum Chloride (AlCl3)-1-Ethyl-3-Methylimidazolium Chloride (EMIC) Ionic Liquid and its Corrosion Behavior, Electrochemistry Communications, vol. 9, (2007), pp. 1602-1606.
Liu et al., Functionalization of Nanoscale Diamond Powder: Fluoro-, Alkyl-, Amino-, and Amino Acid-Nanodiamond Derivatives, Chem. Mater. vol. 16, (2004), pp. 3924-3930.
Simka et al., Electrodeposition of Metals from Non-Aqueous Solutions, Electrochimica Acta, vol. 54, (2009), pp. 5307-5319.
Tsuda et al., Electrochemical Applications of Room-Temperature Ionic Liquids, The electrochemical Society Interface, Spring 2007, pp. 42-49.
Underwood, Ervin E., Quantitative Stereology, Addison Wesley Publishing Company, Inc., (1970), pp. 80-109.
Wu et al., Functionalization of Carbon Nanotubes by an Ionic-Liquid Polymer: Dispersion of Pt and PtRu Nanoparticles on Carbon Nanotubes and Their Electrocatalytic Oxidation of Methanol, Angew. Chem. Int. Ed., vol. 48, (2009), pp. 4751-4754.
"Alkoxy" definition, Wiktionary.org, https://en.wiktionary.org/w/index.php?title=alkoxy&oldid=47708692, retreived from Web Jan. 23, 2018.
"Alkoxy group" definition, Wikipedia.org, https://en.wikipedia.org/w/index.php?title=Alkoxy_group&oldid=792650905, retreived from Web Jan. 23, 2018.
"Alkoxysilane" definition, Wiktionary.org, https://en.wiktionary.org/w/index.php?title=alkoxysilane&oldid=42021502, retreived from Web Jan. 23, 2018.
Tsbota et al., Composite Electroplating of Ni and Surface-Modified Diamond Particles with Silane Coupling Regent, Diamond & Related Materials, vol. 14, No. 3/7, Mar.-Jul. 2005, pp. 608-612.
Strauss et al., Carbon Nanodots—Towards a Comprehensive Understanding of their Photoluminescense, Journal Nov. 4, 2014, 11 pages, American Chemical Society, Washington DC.
Li et al., Carbon nanodots: synthesis, properties and applications, Journal, Dec. 14, 2012, p. 24175-24478, vol. 22, No. 46, J. Mater. Chem.
Kwon et al., Control of Photoluminescence of Carbon Nanodots via Surface Functionalization using Para-substituted Anilines, Sci. Rep. 5, 12604; doi: 10.1038/srep12604 (2015), p. 1-10.
Baker et al., Luminescent Carbon Nanodots: Emergent Nanolights, Angew. Chem. Int. Ed., vol. 49, (2010), pp. 6726-6744.
"Mixture." Merriam-Webster.com. Merriam-Webster, n.d. Web. Dec. 21, 2017. (Year: 2017).

\* cited by examiner

COMPOSITIONS OF COATED DIAMOND NANOPARTICLES, METHODS OF FORMING COATED DIAMOND NANOPARTICLES, AND METHODS OF FORMING COATINGS

CROSS-REFERENCE TO RELATED APPLICATIONS

The subject matter of this application is related to the subject matter of U.S. patent application Ser. No. 14/490,214, filed Sep. 18, 2014, pending, U.S. patent application Ser. No. 14/519,496, filed Oct. 21, 2014, pending, and U.S. patent application Ser. No. 14/744,520, filed Jun. 19, 2015, pending.

FIELD

Embodiments of the present disclosure relate generally to diamond nanoparticles, coatings including diamond nanoparticles, and methods of forming such nanoparticles and coatings, which may be used, for example, to improve the performance of substrates, such as in pumps and other wellbore equipment.

BACKGROUND

To combat the effects of wear-intensive or corrosively inhospitable environments, surfaces of components of tools and other equipment are commonly coated with protective coatings. In particular, hard coatings can be included on these surfaces to improve wear characteristics of surfaces susceptible to abrasion and erosion, and to prolong the lifetime of the components and assemblies of components. Such hard coatings include various ceramics or metals. Polymer coatings may be used to protect from corrosion. However, polymeric coatings can fail at elevated temperatures or under high load, and conventional metal coatings are lacking in certain aspects such as strength-to-weight ratio.

Therefore, coatings having improved mechanical properties that can protect or enhance the performance of components and tools would be beneficial.

BRIEF SUMMARY

In some embodiments, a composition disclosed herein includes a plurality of coated diamond nanoparticles. Each diamond nanoparticle has at least one silane functional group covalently bonded to a surface thereof.

A method of forming coated diamond nanoparticles may include functionalizing surfaces of diamond nanoparticles with at least one of a fluorine-containing compound and an oxidant; dispersing the functionalized diamond nanoparticles in a solvent comprising a silane functional group; and forming covalent bonds between the silane functional group and the diamond nanoparticles.

In some embodiments, a method of forming a diamond coating includes functionalizing surfaces of diamond nanoparticles with at least one of a fluorine-containing compound and an oxidant; dispersing the functionalized diamond nanoparticles in a solvent comprising a silane functional group; forming covalent bonds between the silane functional group and the diamond nanoparticles; and depositing the diamond nanoparticles over a substrate.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular material, apparatus, system, or method, but are merely idealized representations employed to describe certain embodiments. For clarity in description, various features and elements common among the embodiments may be referenced with the same or similar reference numerals.

As used herein, the term "grain size" means and includes a geometric mean diameter of grains measured from a two-dimensional section through a bulk polycrystalline material. The geometric mean diameter of grains may be determined using techniques known in the art, such as those set forth in Ervin E. Underwood, QUANTITATIVE STEREOLOGY, 103-105 (Addison Wesley Publishing Company, Inc., 1970), the disclosure of which is incorporated herein in its entirety by this reference.

As used herein, the term "particle size" means and includes a largest linear dimension of a particle (sometimes referred to as "diameter"). As used herein, "average size" and "average particle size" refer to the number-average particle size based on the largest linear dimension of each particle of a group of particles. Particle size, including average, maximum, and minimum particle sizes, may be determined by an appropriate method of sizing particles such as, for example, static or dynamic light scattering (SLS or DLS) using a laser light source, physical classification such as screening, or any other appropriate method. Accurate measurement of particle sizes may depend on the size range of the particles to be measured.

As used herein, the term "nanoparticle" means and includes a particle having a particle size of less than 1 µm (i.e., less than 1000 nm). As used herein, the terms "nanodiamond" and "diamond nanoparticle" each mean and include nanoparticles of diamond material.

Diamond nanoparticles have beneficial properties, and may be used, for example, to form protective coatings. Methods of forming coated diamond nanoparticles may include functionalizing diamond nanoparticles and reacting the functionalized diamond nanoparticles with a silane group. The silane groups may form covalent bonds with the functionalized diamond nanoparticles.

Figure 1:
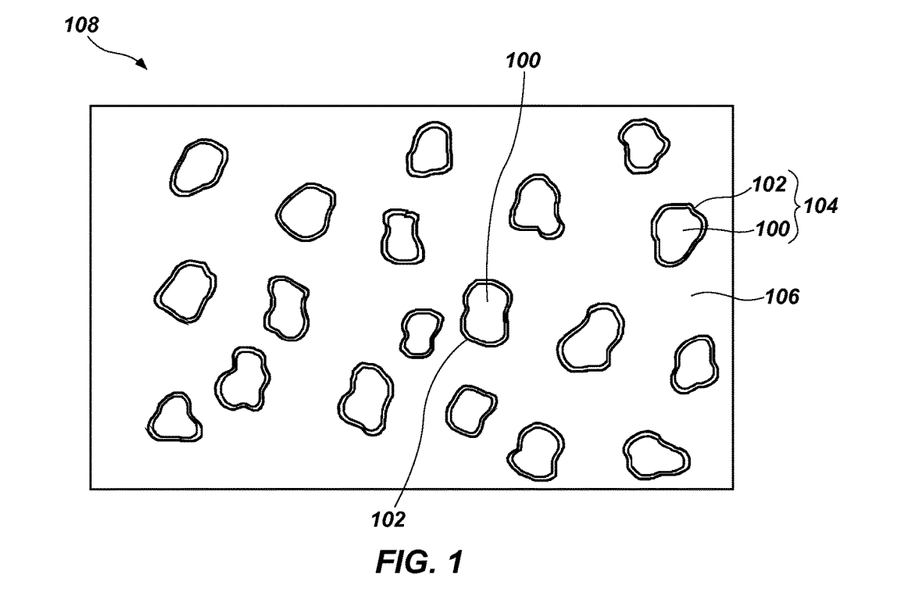
FIGS. 1 through 3 are simplified cross-sectional side views illustrating mixtures of nanoparticles and solvents according to embodiments of the present disclosure.

FIG. 1 is a simplified view illustrating diamond nanoparticles 100. Diamond nanoparticles 100 may be formed by chemical vapor deposition, detonation synthesis, mechanical attrition, or any other methods. The diamond nanoparticles 100 may be monodisperse (i.e., substantially all particles of approximately the same size with little variation) or polydisperse (i.e., the particles having a relatively wide range of sizes). In some embodiments, coated diamond nanoparticles 112 of different average particle sizes may be present. The diamond nanoparticles 100 may have any selected size distribution, which may be monomodal or multimodal (bimodal, trimodal, etc.). The diamond nanoparticles 100 may have a mean diameter from about 1 nm (nanometer) to about 150 nm, from about 1 nm to about 20 nm, from about 20 nm to about 50 nm, from about 50 nm to about 100 nm, or even from about 100 nm to about 150 nm. In some embodiments, the diamond nanoparticles may have a mean diameter from about 2 nm to about 10 nm. For example, the diamond nanoparticles 100 may have a mean diameter from about 4 nm to 5 nm. It has been observed that such diamond nanoparticles 100 may self-organize into primary aggregates from about 20 nm to about 30 nm in size, which may in turn form larger, weakly bonded secondary aggregates ranging in size from hundreds of nanometers to micrometers.

The diamond nanoparticles 100 may include a fluorine coating 102 over at least a portion of the diamond nanoparticles 100. The fluorine coating 102 may be a monolayer over the diamond nanoparticles 100. Together, the fluorine coating 102 and the diamond nanoparticles 100 may be referred to as functionalized diamond nanoparticles 104. The diamond nanoparticles 100 may be functionalized by exposure to fluorine gas ($F_2$), including mixtures of $F_2$ with other gases, such as He or $N_2$.

In some embodiments, the fluorine coating 102 may be formed by contacting the diamond nanoparticles 100 with fluorine gas at elevated temperatures (e.g., from about 50° C. to about 500° C.), as described in U.S. Pat. No. 7,820,130, issued Oct. 26, 2010, titled "Functionalization of Nanodiamond Powder Through Fluorination and Subsequent Derivatization Reactions," the entire disclosure of which is hereby incorporated by reference. The fluorine atoms of the fluorine coating 102 may be covalently bonded to carbon atoms of the diamond nanoparticles 100. The amount of fluorine in the functionalized diamond nanoparticles 104 may be a function of the mean diameter of the diamond nanoparticles 100. For example, if the fluorine coating 102 has a given thickness (e.g., one monolayer), smaller functionalized diamond nanoparticles 104 will have a higher concentration of fluorine (per unit mass or per unit volume of the functionalized diamond nanoparticles 104) than larger functionalized diamond nanoparticles 104. The functionalized diamond nanoparticles 104 may include, for example, from about 1% to about 30% fluorine by weight, such as from about 5% to about 20% fluorine by weight. In some embodiments, the functionalized diamond nanoparticles 104 may include about 15% fluorine by weight. The process of applying the fluorine coating 102 to the diamond nanoparticles 100 may promote dispersion of the diamond nanoparticles 100 and attachment of functional groups to the diamond nanoparticles 100, as discussed in further detail below.

The functionalized diamond nanoparticles 104 may be dispersed in a solvent 106 to form a mixture 108. The solvent 106 may include any material formulated to disperse or suspend the functionalized diamond nanoparticles 104. For example, the solvent 106 may be a polar organic solvent, such as an alcohol (e.g., methanol, ethanol, isopropanol, etc.), dimethylsulfone, acetone, an acetate, dimethsulfoxide, dimethylformamide, γ-butyrolactone, tetrahydrofuran, propylene carbonate, dichloromethane, an ether, an aromatic solvent (e.g., dichlorobenzene) or combinations of one or more of the foregoing. To disperse the functionalized diamond nanoparticles 104, the mixture 108 may be stirred or exposed to ultrasonic energy. The solvent 106 may be selected to be substantially free of surfactants. However, interaction between the fluorine coating 102 and the solvent 106 may keep the functionalized diamond nanoparticles 104 from agglomerating in the solvent 106.

Figure 2:
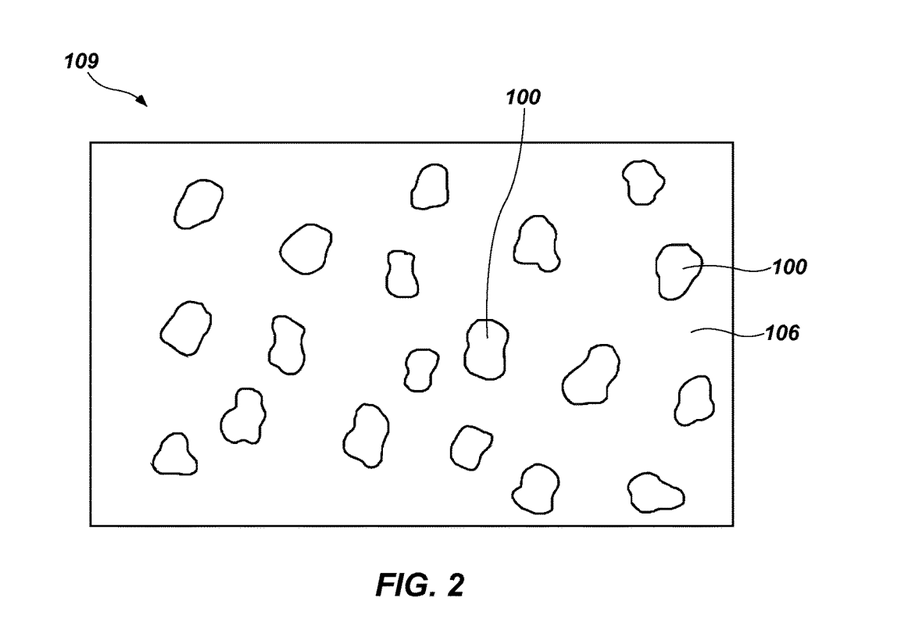

In some embodiments, diamond nanoparticles 100 may not have a fluorine coating 102. In such embodiments, and as shown in FIG. 2, diamond nanoparticles 100 may be exposed to an oxidizer to oxidize surfaces of the diamond nanoparticles 100. For example, the diamond nanoparticles 100 may be contacted with gaseous oxygen at elevated temperatures (e.g., from about 375° C. to about 630° C.), as described in U.S. Patent Publication No. 2010/0028675 A1, published Feb. 4, 2010, titled "Process of Purifying Nanodiamond Compositions and Applications Thereof," the entire disclosure of which is hereby incorporated by reference. In some embodiments, diamond nanoparticles 100 may be exposed to an oxidant such as an acid, ozone, or Fenton's reagent (i.e., a solution of hydrogen peroxide and an iron catalyst). The diamond nanoparticles 100 may be dispersed in a solvent 106 to form a mixture 109. The solvent 106 may be an aqueous fluid, such as water. The process of oxidizing surfaces of the diamond nanoparticles 100 may promote dispersion of the diamond nanoparticles 100 and reaction of functional groups to the diamond nanoparticles 100.

Figure 3:
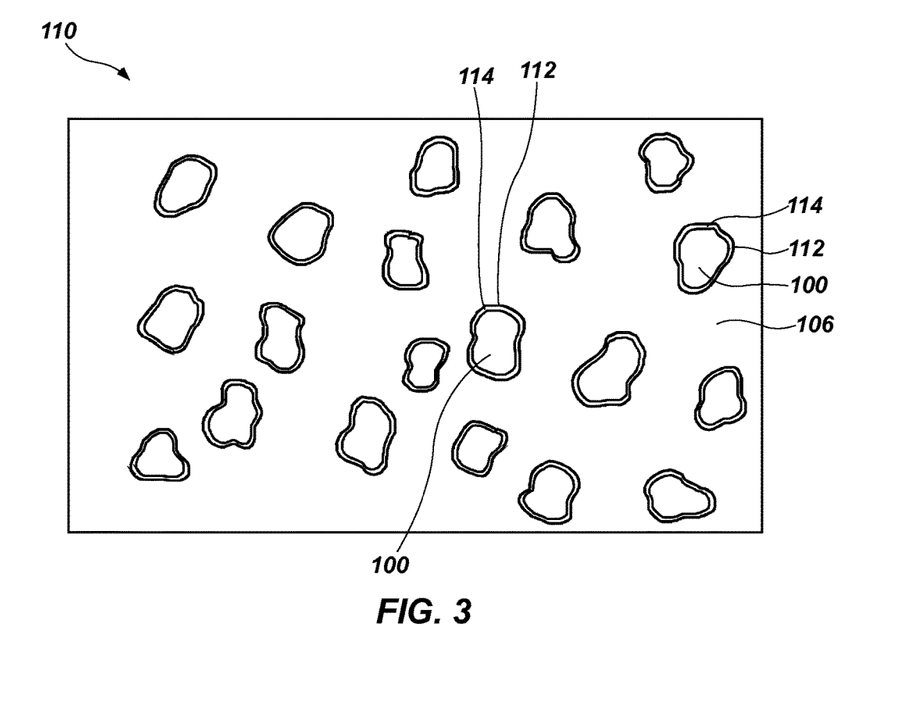

A silane functional group may be dispersed, dissolved, or partially dissolved in the solvent 106. For example, a silane functional group may include a silyl group ($H_3Si$—), a halogen-substituted silyl group (e.g., a trichlorosilyl group ($Cl_3Si$—)), a hydrocarbyl derivative of the form $R_3Si$—, wherein R is a hydrocarbonyl group (for example, $R_3Si$— may be a trimethylsilyl group [$(CH_3)_3Si$—]), alkoxy (mono, di, tri) silane, aminosilane, etc. The silane functional group may be supplied to the solvent by dissolving a silane-containing compound in the solvent 106, either before or after dispersing the diamond nanoparticles 100. The silane functional group may react with the functionalized diamond nanoparticles 104 or the diamond nanoparticles 100 to form coated diamond nanoparticles 112 (FIG. 3) having a silane coating 114 over the diamond nanoparticles 100. Whether the diamond nanoparticles 100 have a fluorine coating 102 (FIG. 1) or an oxidized surface (FIG. 2), covalent bonds may form between the silane functional groups and the diamond nanoparticles 100 to form the silane coating 114 (FIG. 3). Such covalent bonds may be relatively stronger than other bonding modes used in conventional deposition methods onto diamond nanoparticles 100 (e.g., physical vapor deposition may form a physical (i.e., mechanical) bond between deposited material and a substrate). The coated diamond nanoparticles 112 may endure subsequent processing without breaking the covalent bonds. The silane coating 114 may help the coated diamond nanoparticles 112 remain dispersed in the solvent 106 (thus forming a mixture 110) by limiting agglomeration of the coated diamond nanoparticles 112.

Reactions between the silane functional group and the functionalized diamond nanoparticles 104 or the diamond nanoparticles 100 may be performed at or near room temperature, such as from about 15° C. to about 30° C. A higher temperature may correspond to a higher reaction rate; therefore, in some embodiments, the mixture 110 may be maintained at a temperature of up to 50° C., up to 75° C., or even up to 100° C. Selected reaction temperatures may depend on the identity of the silane functional group, the preparation method of the diamond nanoparticles 100 (e.g., whether the diamond nanoparticles 100 have been functionalized or oxidized), the identity of the solvent, or other factors. The reaction may occur at pressures near atmospheric, such that vacuum or pressurization may not be required.

Figure 4:
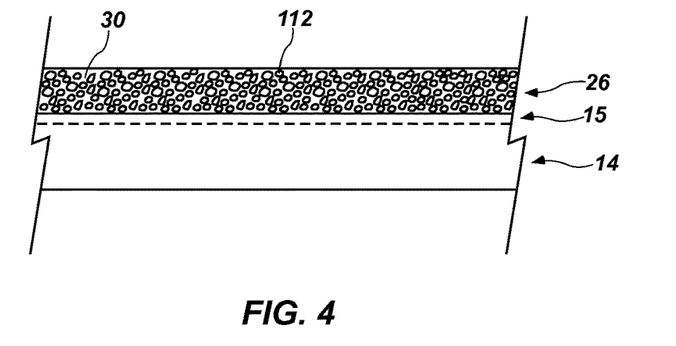
FIG. 4 is a simplified cross-sectional side view of a substrate and a coating thereon according to embodiments of the present disclosure.

The coated diamond nanoparticles 112 may be used to form coatings on substrates. For example, FIG. 4 illustrates a substrate 14 having a coating material 26 formed thereon. The substrate 14 may be electrically conductive or electrically nonconductive. Electrically conductive substrates include metals and alloys or composites thereof. Examples of metal substrates include aluminum, bismuth, boron, calcium, cobalt, copper, chromium, iron, lead, magnesium, manganese, molybdenum, nickel, niobium, nitrogen, phosphorous, selenium, sulfur, tantalum, tellurium, titanium, tungsten, vanadium, zirconium, silicon, zinc, a rare earth element, or a combination or alloy thereof. Examples of alloy substrates include nickel-cobalt, ferrous alloys, magnesium alloys (e.g., Mg—Al alloys, MgZrZn, MgAlZn, etc.), aluminum alloys, etc.

In some embodiments, the substrate 14 may be electrically nonconductive (e.g., a polymer, ceramic, glass, etc.). An electrically nonconductive substrate may include a strike layer 15 comprising an electrically conductive material (e.g., a metal) disposed on a surface of the substrate 14. The strike layer 15, if present, may cover all or a portion of the substrate 14. In some embodiments, the substrate 14 may not include a strike layer 15. The substrate 14 may have any shape (e.g., planar, round, mesh, polygonal, rectangular, annular, etc.), and may be smooth or rough. The substrate 14 may have an edge such as a corner, break, hole, pore, etc. The coating material 26 includes coated diamond nanoparticles 112, and is disposed on the substrate 14. The coating material 26 may include bonded particles having an average grain size from about 1 nm to about 150 nm, from about 1 nm to about 20 nm, from about 20 nm to about 50 nm, from about 50 nm to about 100 nm, or even from about 100 nm to about 150 nm.

Figure 5:
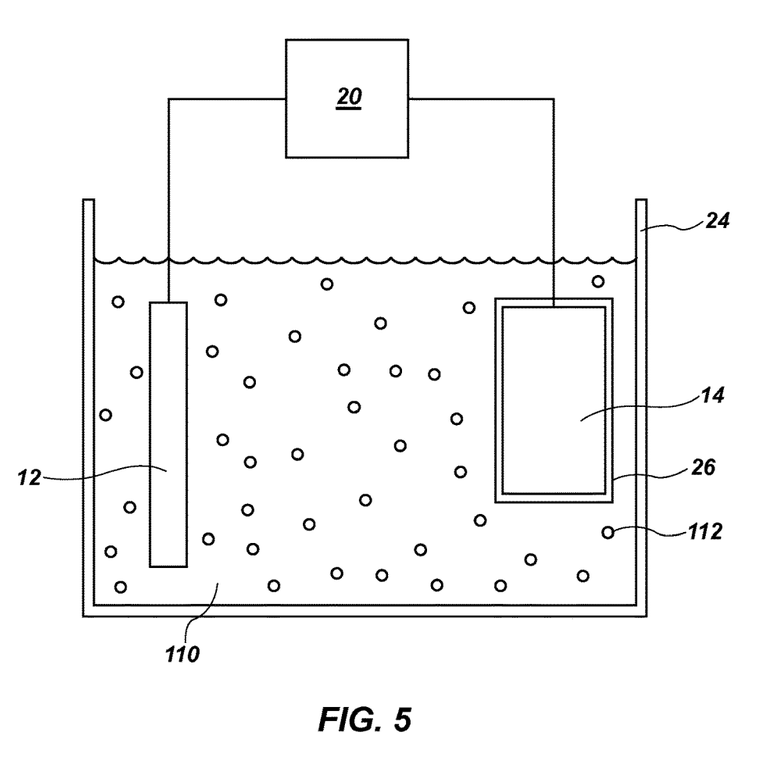
FIG. 5 is a simplified cross-sectional side view illustrating a method of forming a coating on a substrate by electroplating according to an embodiment of the present disclosure.

The coating material 26 may be formed by depositing the coated diamond nanoparticles 112 over the substrate 14. For example, the coated diamond nanoparticles 112 may be deposited by electrochemical means, such as by electroplating or electroless deposition. In some embodiments, and as shown in FIG. 5, the substrate 14 may be placed in the mixture 110 of the coated diamond nanoparticles 112 and the solvent 106. The substrate 14 may be biased with an electrical potential for depositing the coated diamond nanoparticles 112 thereon. That is, the substrate 14 may be a cathode. As shown in FIG. 5, the substrate 14, which may function as a cathode in an electroplating process, may be disposed in a container 24 and electrically connected to a power supply 20. An anode 12 may be connected to the power supply 20. The voltage is applied between the anode 12 and the substrate 14 so that the potential of the substrate 14 is lower than the potential of the anode 12. Under such an applied voltage, the coated diamond nanoparticles 112 deposit on the substrate 14 to form the coating material 26. The coating material 26 may be continuously formed, without stopping the applied voltage, and without forming the coating layer-by-layer. In some embodiments, the coating material 26 may be formed in a plurality of discrete applications of the voltage (e.g., to form the coating material 26 having layers of differing compositions).

The mixture 110 provides the coated diamond nanoparticles 112 deposited as the coating material 26. One or more other materials 30 may be co-deposited with coated diamond nanoparticles 112. For example, metal ions in the mixture 110 may provide a metal interspersed with the coated diamond nanoparticles 112 over the substrate 14. The anode 12, if present, may include a metal, such as a metal co-deposited with the coated diamond nanoparticles 112.

In embodiments in which an anode 12 is used (e.g., as shown in FIG. 5), the anode 12 may have a shape that complements or corresponds to the shape of the substrate 14 to mediate the current density and, thus, coating thickness. In an embodiment, the anode 12 has a different shape than the substrate 14.

Figure 6:
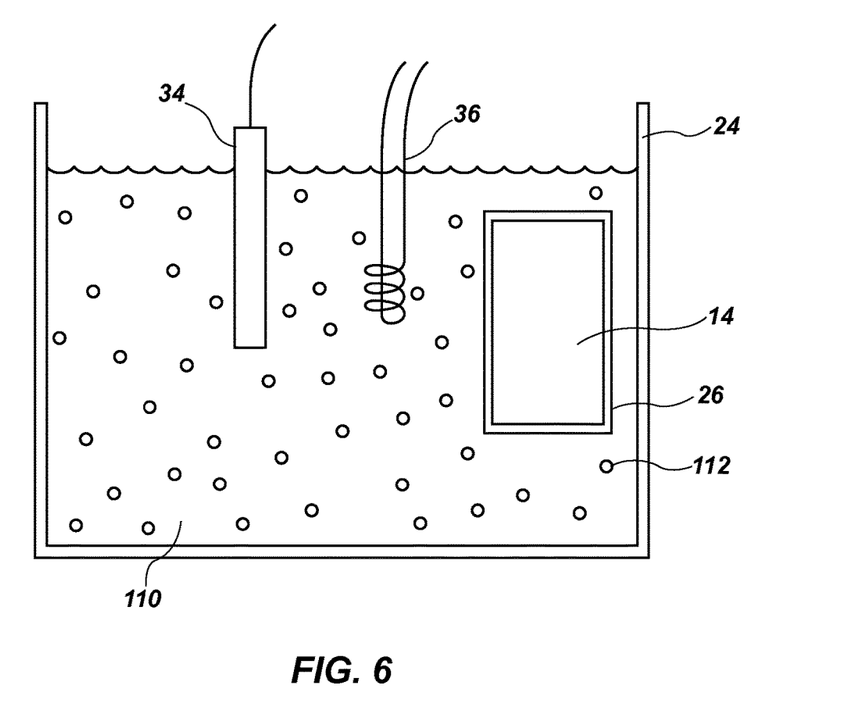
FIG. 6 is a simplified cross-sectional side view illustrating a method of forming a coating on a substrate by electroless deposition according to an embodiment of the present disclosure.

According to an embodiment, and as illustrated in FIG. 6, the deposition of the coating material 26 on the substrate 14 may be electroless where an anode 12 (FIG. 5) is not present. In an electroless deposition process, the substrate 14 may be placed in the mixture 110 of the coated diamond nanoparticles 112 and the solvent 106. The coated diamond nanoparticles 112 may deposit on the substrate 14 to form the coating material 26. The coating material 26 may be continuously formed while the substrate 14 is in the mixture 110. In some embodiments, the coating material 26 may be formed in a plurality of discrete applications by removing the substrate 14 from the mixture and reinserting the substrate 14 into the mixture.

In electroplating (FIG. 5) or electroless deposition (FIG. 6), a suitable pH monitor 34 (see FIG. 6) (e.g., an electronic pH monitor, litmus paper, an acid-base indicator, etc.) may be used to monitor the pH of the mixture 110. The temperature of the electrodeposition configuration may be monitored and/or controlled via a temperature sensor or controller 36, such as thermocouple, resistance temperature detector, infrared detector, heating element, cooling element, etc.

The pH of the mixture 110 may be maintained in a range from about 2 to about 10, from about 2 to about 9, or from about 3 to about 9 during deposition of the coating material 26 on the substrate 14. The temperature of the electrodeposition configuration or component(s) thereof may be maintained in a range from about 15° C. to about 100° C., such as from about 20° C. to about 90° C., or from about 20° C. to about 80° C. Deposition may occur at any selected pressure, including atmospheric pressure, sub-atmospheric pressure (i.e., under a vacuum condition), or at greater than atmospheric pressure.

During deposition of the coated diamond nanoparticles 112 on the substrate 14 to form the coating material 26, the coated diamond nanoparticles 112 may follow the applied electric field to the substrate 14. In some embodiments, the coated diamond nanoparticles 112 have a positive net charge in a certain pH range. Consequently, the pH of the mixture 110 may be altered to alter the charge density on the coated diamond nanoparticles 112 or change the polarity of the charge on the coated diamond nanoparticles 112. Changing the charge density on the coated diamond nanoparticles 112 may change the number density of the coated diamond nanoparticles 112 in the growing coating material 26 (i.e., number of coated diamond nanoparticles 112 per unit volume of coating material 26) by varying the relative deposition rate of the coated diamond nanoparticles 112 with respect to other materials 30 of the coating material 26.

In some embodiments, the thickness of the coating material 26 may be in a range from several nanometers (nm) to several millimeters (mm) thick, such as greater than or equal to about 10 nm, greater than or equal to about 1 micrometer (μm), or even greater than or equal to about 20 centimeters (cm). According to an embodiment, the thickness of the coating material 26 is at least about 10 μm, such as at least about 40 μm, or from about 50 μm to about 100 μm. In some embodiments, the thickness of the coating material 26 is from about 1 μm to about 100 μm.

The coated diamond nanoparticles 112 may be uniformly or non-uniformly distributed (e.g., in a gradient distribution) in the coating material 26. For example, the number density of the coated diamond nanoparticles 112 proximate to the substrate 14 may be less than the number density of the coated diamond nanoparticles 112 distal to the substrate 14, with the number density of the coated diamond nanoparticles 112 changing smoothly (i.e., linearly by distance from the substrate 14) in a gradient. In another embodiment, the number density of the coated diamond nanoparticles 112 proximate to the substrate 14 is greater than the number density of the coated diamond nanoparticles 112 distal to the substrate 14, with the number density of the coated diamond nanoparticles 112 changing smoothly (i.e., linearly by distance from the substrate 14) in a gradient. If the number density of the coated diamond nanoparticles 112 in the coating material 26 varies by location in the coating material 26, the number density may change abruptly instead of smoothly, e.g., monotonically with respect to distance from the substrate 14 or in a direction parallel to the surface of the substrate 14.

Operating parameters used in a deposition process may be varied during deposition of the coated diamond nanoparticles 112 and other materials 30 (if present) on the substrate 14. For example, the electric potential, the type or concentration of other materials in the mixture 110, the size or concentration of coated diamond nanoparticles 112, or any combination thereof may be varied to form the coating material 26 on the substrate 14. In one embodiment, the coating material 26 may include multiple layers having different compositions. Such a multilayer coating material 26 may be formed, for example, by modulating the electric potential or changing the rate of deposition of a component of the coating material 26 (e.g., the coated diamond nanoparticles 112 or other material 30).

The coating material 26 may be continuous or discontinuous and of variable or uniform thickness. In an embodiment, a portion of the substrate 14 is masked so that the coating material 26 is formed to be discontinuous on the substrate 14 and, in particular, to be absent from the masked portion of the substrate 14. The mask may be removed or may remain on the substrate 14 after formation of the coating material 26.

The coating material 26 and the coated substrate may exhibit advantageous properties including hardness in comparison to coatings that contain only metals or metal with additives such as ceramics. The Vickers hardness of the coating material 26 may be from about 400HV30 to about 950HV30, such as from about 500HV30 to about 900HV30. Moreover, the coating material 26 may provide a decreased coefficient of friction (e.g., with respect to pure a metal coating) from about 0.8 to about 0.1, such as from about 0.8 to about 0.2. The coating material 26 may provide a robust barrier for gases and liquids, i.e., the coating material 26 may exhibit low permeability for, e.g., sour gases or liquids, hydrocarbons, acids, bases, solvents, etc. The coating material 26 may be abrasion-resistant, meaning that the coating material 26 exhibits relatively less wear than the underlying substrate 14 when exposed to abrasive materials.

In some embodiments, the coating material 26 (and a substrate 14 having a coating material 26 thereon) may exhibit a compressive strength from about 50 kilopounds per square inch (ksi) (345 megapascals (MPa)) to about 150 ksi (1,034 MPa); or a yield strength from about 30 ksi (207 MPa) to about 100 ksi (689 MPa), such as from about 60 ksi (414 MPa) to about 80 ksi (552 MPa). In an embodiment, an article or apparatus comprising the coating material 26 can include multiple components that are combined or interwork, e.g., a slip and a tubular. The components of the article or apparatus can have the same or different material properties, such as percent elongation, compressive strength, tensile strength, etc.

To further increase the strength of the coating material 26, the coating material 26 may be subjected to surface processing, including surface hardening. That is, a surface-hardened product of the coating material 26 may be formed by subjecting the coating material 26 to, e.g., carburizing, nitriding, carbonitriding, boriding, flame hardening, induction hardening, laser beam hardening, electron beam hardening, hard chromium plating, electroless nickel plating, thermal spraying, weld hardfacing, ion implantation, or any combination thereof.

The coating material 26 may be applied to various substrates 14 and thus has a wide range of uses, particularly for wear applications in which a substrate without the coating material 26 would otherwise be subjected to excessive wear, erosion, corrosion, abrasion, scratching, etc. In an embodiment, the substrate 14 is a part of a downhole tool, such as an electro-submersible pump, part of a frac pump (i.e., a high-pressure, high-volume pump used for hydraulic fracturing), a drill bit body, a downhole motor, a valve, a flow diverter, etc. The coating material 26 may exhibit beneficial wear properties for components expected to be exposed to wear, erosion, or corrosion, such as components exposed to drilling, fracturing, stimulation and production fluids, any of which may carry solids.

In some embodiments, compositions may include a plurality of diamond nanoparticles dispersed in a solvent. Each diamond nanoparticle may have at least one silane functional group covalently bonded to a surface thereof. For example, as illustrated in FIG. 3, coated diamond nanoparticles 112 may be mixed with a solvent 106. The solvent 106 may be free or substantially free of surfactants, yet the coated diamond nanoparticles 112 may be suspended in the solvent 106 due to repulsion of the silane functional groups from one another.

Additional non limiting example embodiments of the disclosure are described below.

Embodiment 1: A composition comprising a plurality of coated diamond nanoparticles. Each diamond nanoparticle has at least one silane functional group covalently bonded to a surface thereof.

Embodiment 2: The composition of Embodiment 1, wherein the plurality of coated diamond nanoparticles is dispersed in a solvent.

Embodiment 3: The composition of Embodiment 2, wherein the solvent comprises water.

Embodiment 4: The composition of Embodiment 2, wherein the solvent comprises an organic polar solvent.

Embodiment 5: The composition of any of Embodiments 2 through 4, wherein the composition is substantially free of surfactants.

Embodiment 6: The composition of Embodiment 1, wherein the plurality of coated diamond nanoparticles comprises a coating over a substrate.

Embodiment 7: The composition of Embodiment 6, wherein the coating is bonded to an electrically conductive material over the substrate.

Embodiment 8: A method of forming coated diamond nanoparticles, comprising: functionalizing surfaces of diamond nanoparticles with at least one of a fluorine-containing compound and an oxidant; dispersing the functionalized diamond nanoparticles in a solvent comprising a silane functional group; and forming covalent bonds between the silane functional group and the diamond nanoparticles.

Embodiment 9: The method of Embodiment 8, wherein functionalizing surfaces of diamond nanoparticles comprises exposing the diamond nanoparticles to fluorine gas.

Embodiment 10: The method of Embodiment 8, wherein functionalizing surfaces of diamond nanoparticles comprises oxidizing a surface of the diamond nanoparticles.

Embodiment 11: The method of Embodiment 8 or Embodiment 9, wherein dispersing the functionalized diamond nanoparticles in a solvent comprises dispersing the functionalized diamond nanoparticles in a polar organic solvent.

Embodiment 12: The method of Embodiment 11, wherein the polar organic solvent comprises at least one solvent selected from the group consisting of alcohols, dimethylsulfone, acetone, acetates, dimethsulfoxide, dimethylformamide, γ-butyrolactone, tetrahydrofuran, propylene carbonate, dichloromethane, ethers, and aromatic solvents.

Embodiment 13: The method of Embodiment 8 or Embodiment 10, wherein dispersing the functionalized diamond nanoparticles in a solvent comprises dispersing the functionalized diamond nanoparticles in water.

Embodiment 14: The method of any of Embodiments 8 through 13, wherein dispersing the functionalized diamond nanoparticles in a solvent comprises dispersing the functionalized diamond nanoparticles in a solvent comprising a silane functional group selected from the group consisting of a silyl group, halogen-substituted silyl groups, hydrocarbyl derivatives of silyl groups, alkoxy silanes, and aminosilanes.

Embodiment 15: The method of any of Embodiments 8 through 14, wherein dispersing the functionalized diamond nanoparticles in a solvent comprises dispersing the functionalized diamond nanoparticles in a solvent substantially free of surfactants.

Embodiment 16: The method of any of Embodiments 8 through 15, further comprising heating the solvent to a temperature from about 50° C. to about 100° C.

Embodiment 17: The method of any of Embodiments 8 through 16, further comprising applying ultrasonic energy to the functionalized diamond nanoparticles and the solvent to disperse the functionalized diamond nanoparticles in the solvent.

Embodiment 18: A method of forming a diamond coating, comprising functionalizing surfaces of diamond nanoparticles with at least one of a fluorine-containing compound and an oxidant; dispersing the functionalized diamond nanoparticles in a solvent comprising a silane functional group; forming covalent bonds between the silane functional group and the diamond nanoparticles; and depositing the diamond nanoparticles over a substrate.

Embodiment 19: The method of Embodiment 18, wherein depositing the diamond nanoparticles over a substrate comprises electroless deposition of the diamond nanoparticles.

Embodiment 20: The method of Embodiment 18, wherein depositing the diamond nanoparticles over a substrate comprises electroplating the diamond nanoparticles over the substrate.

Embodiment 21: The method of any of Embodiments 18 through 20, wherein depositing the diamond nanoparticles over a substrate comprises depositing the diamond nanoparticles over a substrate comprising a material selected from the group consisting of metals, alloys, polymers, ceramics, and glass.

Embodiment 22: The method of any of Embodiments 18 through 21, wherein depositing the diamond nanoparticles over a substrate comprises depositing the diamond nanoparticles over a substrate comprising a material selected from the group consisting of aluminum, bismuth, boron, calcium, cobalt, copper, chromium, iron, lead, magnesium, manganese, molybdenum, nickel, niobium, nitrogen, phosphorous, selenium, sulfur, tantalum, tellurium, titanium, tungsten, vanadium, zirconium, silicon, zinc, a rare earth element, or a combination or alloy thereof.

Embodiment 22: The method of any of Embodiments 17 through 20, wherein depositing the diamond nanoparticles over a substrate comprises depositing the diamond nanoparticles over a substrate comprising a material selected from the group consisting of nickel-cobalt alloys, ferrous alloys, magnesium alloys, and aluminum alloys.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various substrate and particle types and configurations.

What is claimed is:

1. A composition, comprising:
   a plurality of coated diamond nanoparticles dispersed in water, each diamond nanoparticle having at least one silane functional group covalently bonded directly to a surface thereof, the at least one silane functional group selected from the group consisting of halogen-substituted silanes and alkoxysilanes.

2. The composition of claim 1, wherein the composition is substantially free of surfactants.

3. The composition of claim 1, wherein the pH of the water is between 3 and 6.

4. A method, comprising:
   functionalizing surfaces of diamond nanoparticles with at least one of a fluorine-containing compound and an oxidant;
   dispersing the functionalized diamond nanoparticles in a solvent comprising a silane functional group selected from the group consisting of halogen-substituted silanes and alkoxysilanes;
   forming covalent bonds directly between the silane functional group and the diamond nanoparticles to create coated diamond nanoparticles, each diamond nanoparticle having at least one silane functional group covalently bonded directly to a surface thereof, the at least one silane functional group selected from the group consisting of halogen-substituted silanes and alkoxysilanes; and
   dispersing a plurality of the coated diamond nanoparticles in water.

5. The method of claim 4, wherein functionalizing surfaces of diamond nanoparticles comprises exposing the diamond nanoparticles to fluorine gas.

6. The method of claim 4, wherein functionalizing surfaces of diamond nanoparticles comprises oxidizing a surface of the diamond nanoparticles.

7. The method of claim 4, wherein dispersing the functionalized diamond nanoparticles in a solvent comprising a silane functional group selected from the group consisting of halogen-substituted silanes and alkoxysilanes comprises dispersing the functionalized diamond nanoparticles in a polar organic solvent.

8. The method of claim 4, wherein dispersing the functionalized diamond nanoparticles in a solvent comprising a silane functional group selected from the group consisting of halogen-substituted silanes and alkoxysilanes comprises dispersing the functionalized diamond nanoparticles in water.

9. The method of claim 4, wherein dispersing the functionalized diamond nanoparticles in a solvent comprising a silane functional group selected from the group consisting of halogen-substituted silanes and alkoxysilanes comprises dispersing the functionalized diamond nanoparticles in a solvent substantially free of surfactants.

10. The method of claim 4, further comprising heating the solvent comprising a silane functional group selected from the group consisting of halogen-substituted silanes and alkoxysilanes to a temperature from about 50° C. to about 100° C.

11. The method of claim 4, further comprising applying ultrasonic energy to the functionalized diamond nanoparticles and the solvent comprising a silane functional group selected from the group consisting of halogen-substituted silanes and alkoxysilanes to disperse the functionalized diamond nanoparticles in the solvent.

12. The method of claim 4, further comprising depositing at least one of the plurality of the coated diamond nanoparticles onto a substrate.

13. The method of claim 12, wherein depositing the at least one of the plurality of the coated diamond nanoparticles onto a substrate comprises electroless deposition onto the substrate of the at least one of the plurality of the coated diamond nanoparticles.

14. The method of claim 12, wherein depositing the at least one of the plurality of the coated diamond nanoparticles onto a substrate comprises electroplating onto the substrate the at least one of the plurality of the coated diamond nanoparticles.

15. A method of forming a diamond coating, comprising:
functionalizing surfaces of diamond nanoparticles with at least one of a fluorine-containing compound and an oxidant;
dispersing the functionalized diamond nanoparticles in a solvent comprising a silane functional group selected from the group consisting of halogen-substituted silanes and alkoxysilanes;
forming covalent bonds directly between the silane functional group and the diamond nanoparticles to create coated diamond nanoparticles, each diamond nanoparticle having at least one silane functional group covalently bonded directly to a surface thereof, the at least one silane functional group selected from the group consisting of halogen-substituted silanes and alkoxysilanes;
dispersing a plurality of the coated diamond nanoparticles in water; and
depositing the diamond nanoparticles over a substrate.

16. The method of claim 15, wherein depositing the diamond nanoparticles over a substrate comprises electroless deposition of the diamond nanoparticles.

17. The method of claim 15, wherein depositing the diamond nanoparticles over a substrate comprises electroplating the diamond nanoparticles over the substrate.

18. The method of claim 15, wherein depositing the diamond nanoparticles over a substrate comprises depositing the diamond nanoparticles over a substrate comprising a material selected from the group consisting of metals, alloys, polymers, ceramics, and glass.

* * * * *